(12) United States Patent
Thomas

(10) Patent No.: US 7,373,928 B2
(45) Date of Patent: May 20, 2008

(54) METHOD FOR STARTING A DIRECT INJECTION ENGINE

(76) Inventor: Joseph Thomas, 6947 Flinchbaugh Rd., Kimball, MI (US) 48074

( * ) Notice: Subject to any disclaimer, the term of this patent is extended or adjusted under 35 U.S.C. 154(b) by 0 days.

(21) Appl. No.: 11/421,184

(22) Filed: May 31, 2006

(65) Prior Publication Data

US 2007/0277776 A1    Dec. 6, 2007

(51) Int. Cl.
*F02B 3/00* (2006.01)
*F02M 1/00* (2006.01)
*F02M 51/00* (2006.01)

(52) U.S. Cl. ........................ 123/491; 123/299
(58) Field of Classification Search ............... 123/491, 123/295, 299, 300, 305, 406.53, 406.54, 123/179.16
See application file for complete search history.

(56) References Cited

U.S. PATENT DOCUMENTS

| 5,425,340 | A | | 6/1995 | Petitbon et al. | |
|---|---|---|---|---|---|
| 5,447,143 | A | | 9/1995 | Ott et al. | |
| 5,482,017 | A | * | 1/1996 | Brehob et al. | 123/299 |
| 5,575,259 | A | * | 11/1996 | Fukui et al. | 123/406.47 |
| 5,595,161 | A | | 1/1997 | Ott et al. | |
| 5,604,304 | A | | 2/1997 | Kokubo et al. | |
| 5,678,551 | A | | 10/1997 | Stevens | |
| 5,823,166 | A | | 10/1998 | Entenmann et al. | |
| 6,050,231 | A | * | 4/2000 | Tisch et al. | 123/179.1 |
| RE36,737 | E | * | 6/2000 | Brehob et al. | 123/299 |
| 6,341,253 | B1 | | 1/2002 | Honda | |
| 6,460,526 | B1 | | 10/2002 | Ward | |
| 6,499,342 | B1 | | 12/2002 | Gonzales, Jr. | |
| 6,626,030 | B2 | | 9/2003 | Shimizu | |
| 6,679,223 | B2 | | 1/2004 | Sakakibara | |
| 7,051,701 | B2 | * | 5/2006 | Tomita | 123/299 |
| 7,124,734 | B2 | * | 10/2006 | Almkvist et al. | 123/299 |
| 7,234,440 | B2 | * | 6/2007 | Hilditch | 123/305 |
| 7,234,442 | B2 | * | 6/2007 | Hanson et al. | 123/332 |
| 2005/0161018 | A1 | * | 7/2005 | Tomita | 123/299 |
| 2006/0185351 | A1 | * | 8/2006 | Eves et al. | 60/285 |
| 2007/0068485 | A1 | * | 3/2007 | Hilditch | 123/299 |

FOREIGN PATENT DOCUMENTS

| DE | 4418579 B4 | | 2/2004 |
|---|---|---|---|
| EP | 0612373 B1 | | 11/1995 |
| EP | 0576334 B1 | | 1/1996 |
| EP | 0615111 B1 | | 10/1996 |
| EP | 0683855 B1 | | 8/1997 |
| EP | 0775257 B1 | | 2/2000 |
| EP | 0932751 B1 | | 5/2002 |
| EP | 0942163 | | 3/2004 |
| FR | 2663369 | | 12/1991 |
| JP | 58-169360 | | 5/1983 |
| JP | 5-229092 | | 7/1993 |
| JP | 2006-144750 | * | 6/2006 |
| WO | WO 2005/124129 | | 12/2005 |

* cited by examiner

*Primary Examiner*—Hai H Huynh
(74) *Attorney, Agent, or Firm*—Donald J. Lewis; Allan J. Lippa

(57) ABSTRACT

A method for starting an engine having fuel injected directly into cylinders of the engine is presented. The method can use multiple injections of fuel to start the engine even when the absolute position of each piston is not known. Furthermore, once the engine is started the individual piston positions can be determined and then the engine can be operated in a conventional manner.

22 Claims, 7 Drawing Sheets

METHOD FOR STARTING A DIRECT INJECTION ENGINE

FIELD

The present description relates to a method for starting an engine having fuel directly injected into the engine cylinders.

BACKGROUND

An engine may be started by injecting fuel more than once during a cycle of a cylinder. One method that controls injection in this way is presented in U.S. Pat. No. 6,578,551. This method provides two fuel injection events during the first combustion cycle of the respective cylinders and then transitions to a single injection event per cylinder as the engine is started. Initially, fuel is injected simultaneously to all cylinders and then fuel is simultaneously injected to cylinders one and three before a first combustion event in the respective cylinders. The second injection to cylinder one occurs during the intake stroke of cylinder one while the second injection to cylinder three occurs during the exhaust stroke of cylinder three. The fuel injections are delivered to the intake ports and are inducted into the cylinders during the respective intake strokes. According to the above-mentioned specification, this strategy can reduce starting time and may reduce HC emissions.

The above-mentioned method can also have several disadvantages. For example, the method appears to rely on engine position information from two position sensors (one that provides angle information and one that provides phase information) to start the engine and does not appear to provide a starting procedure if the phase sensor information is not available. In other words, if the engine phase signal is degraded then it is not apparent that the respective strokes of the cylinders can be determined. Therefore, fuel injection as is described during the initial intake stroke of cylinder one and the exhaust stroke of cylinder three may not be assured. As a result, the engine may not start or it may be possible to start the engine, but the starting time may be increased by as much as two engine revolutions. Further, the fueling for each of the engine cylinders may be out of phase with respect to the desired cylinder fuel timing as the engine operates. Consequently, it may be possible to inject fuel during an open intake valve interval when intending to inject during a closed valve interval, for example.

The inventor herein has recognized the above-mentioned disadvantages and has developed a method to control engine valves during stopping and starting that offers substantial improvements.

SUMMARY

One example approach to overcome at least some of the disadvantages of prior approach includes a method for starting an engine having fuel directly injected into at least an engine cylinder, the method comprising: injecting a first fuel amount into at least one cylinder of an engine before the piston of said cylinder reaches a first top-dead-center (TDC) position and injecting a second fuel amount into said cylinder before said piston reaches a second TDC position during a cycle of said cylinder, said cycle during an engine start. This method can be used to reduce the above-mentioned limitations of the prior art approach.

By injecting fuel twice into a cylinder, during a cycle of the cylinder, an engine can be started and it may be started quickly even when the absolute position of the engine is not known. In one example, engines having four or more cylinders commonly have a pair of pistons that follow the same trajectory through the cylinder as the engine rotates (e.g., for a four cylinder engine having a firing order of 1-3-4-2 the pistons for cylinders one and four will be at TDC simultaneously although one cylinder will be on the intake stroke while the other is on the power/expansion stroke). Fuel may be simultaneously injected to the cylinder pair using direct injection. This capability in conjunction with the ability to use the crankshaft sensor to determine piston position in the cylinder allows quick engine starting even in the absence of cylinder phase information. Specifically, injection may be scheduled twice during the cylinder cycles, during the intake stroke of one cylinder and during the power stroke of the other cylinder for example, so that fuel will be present in each cylinder during compression stroke of the respective cylinder. The compressed air-fuel mixture can then be combusted to start the engine. Fuel injected during the power stroke of the opposite cylinder can be summarily discharged to the exhaust system. When the engine reaches a predetermined operating condition, a desired speed for example, one of the two fuel injections to one cylinder of the cylinder pair may be stopped to determine if a misfire is produced. The misfire information can then be used to properly synchronize fuel delivery to the cylinders so that the fuel injected during the cylinder power stroke is stopped. Thus, the engine can be started and fuel timing can be synchronized with engine position even when engine phase (cylinder stroke) information is not available.

The present description provides several advantages. Specifically, the method can be used to start a direct injection engine when absolute engine position is not known. Further, the method can be used to determine the absolute position of the engine after the engine has started so that fuel timing may be synchronized with engine position. Further still, the method allows the engine to be quickly started since no more than one engine revolution is necessary to determine when the engine can be fueled.

The above advantages and other advantages, and features of the present description will be readily apparent from the following Detailed Description when taken alone or in connection with the accompanying drawings.

BRIEF DESCRIPTION OF THE DRAWINGS

The advantages described herein will be more fully understood by reading an example of an embodiment, referred to herein as the Detailed Description, when taken alone or with reference to the drawings, wherein.

DETAILED DESCRIPTION

Figure 1:
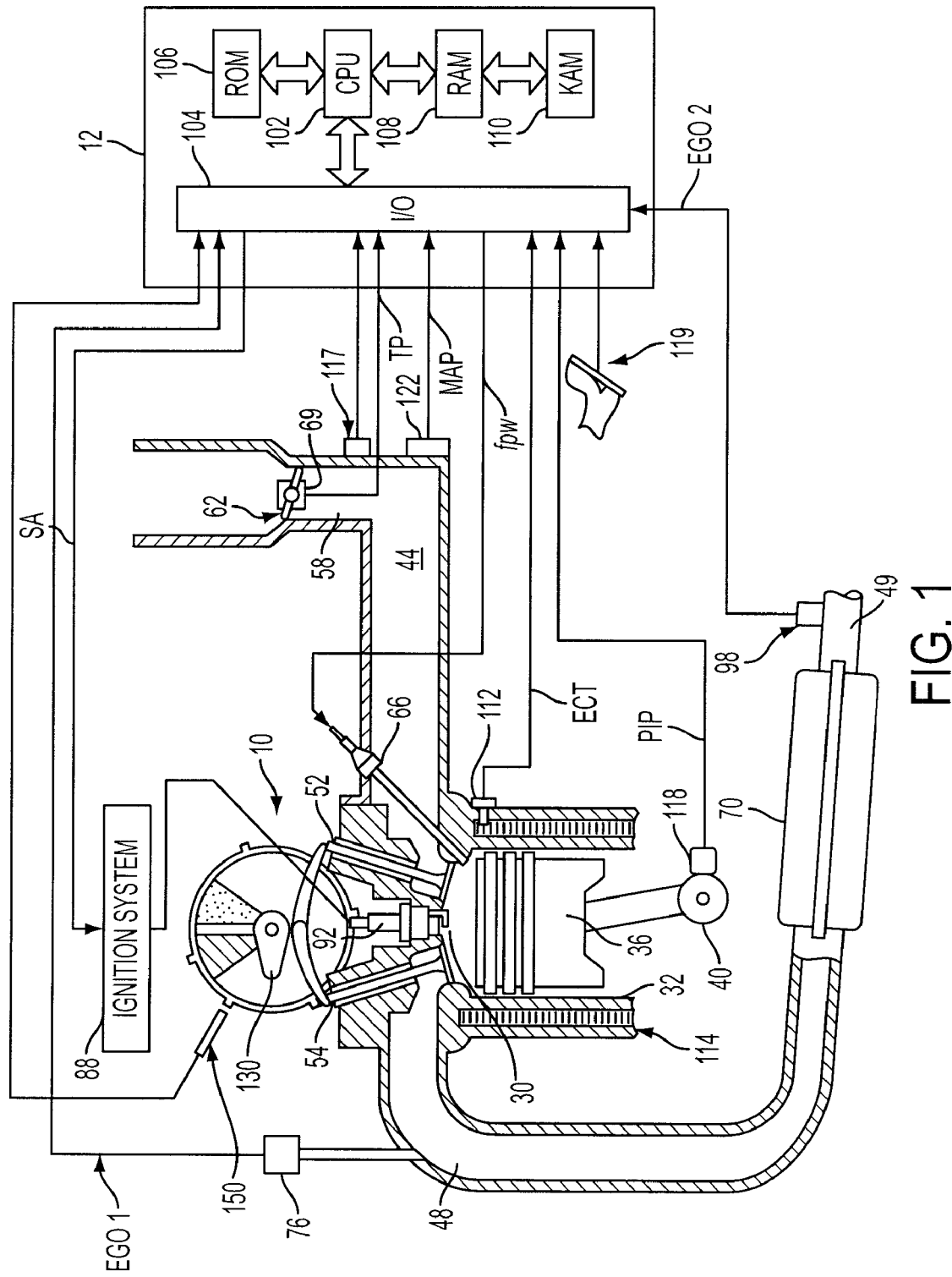
FIG. 1 is a schematic diagram of an engine.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with cam shaft 130 and piston 36 positioned therein and connected to crankshaft 40. Combustion chamber 30 is known communicating with intake manifold 44 and exhaust manifold 48 via respective intake valve 52 an exhaust valve 54. Fuel injector 66 is shown having a nozzle capable if injecting fuel directly into combustion chamber 30 in an amount in proportion to the pulse width of signal FPW from controller 12. Fuel is delivered to fuel injector 66 by fuel system (not shown) including a fuel tank, fuel pump, and fuel rail (not shown). Intake manifold 44 is also shown communicating with throttle body 58 via throttle plate 62.

Conventional distributorless ignition system 88 provides ignition spark to combustion chamber 30 via spark plug 92 in response to controller 12. Alternatively, the spark plug and ignition system may be removed for compression ignition engines. Two-state exhaust gas oxygen sensor 76 is shown coupled to exhaust manifold 48 upstream of catalytic converter 70. Alternatively, a Universal Exhaust Gas Oxygen (UEGO) sensor may be substituted for two-state sensor 76. Two-state exhaust gas oxygen sensor 98 is shown coupled to exhaust pipe 49 downstream of catalytic converter 70. Sensor 76 provides signal EGO1 to controller 12.

Controller 12 is shown in FIG. 1 as a conventional microcomputer including: microprocessor unit 102, input/output ports 104, and read-only memory 106, random-access memory 108, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a measurement of manifold absolute pressure (MAP) form pressure sensor 122 coupled to intake manifold 44; a measurement (ACT) of engine air amount temperature or manifold temperature from temperature sensor 117; a cam position signal (CAM) from a variable reluctance cam sensor 150; and a crankshaft position signal (CPS) from a variable reluctance sensor 118 coupled to a crankshaft 40, and an engine torque demand sensor 119. Alternatively, other types of sensors may be substituted for the above-mentioned sensor type (e.g., Hall sensors or optical sensors may be used in place of variable reluctance sensors).

Figure 2A:
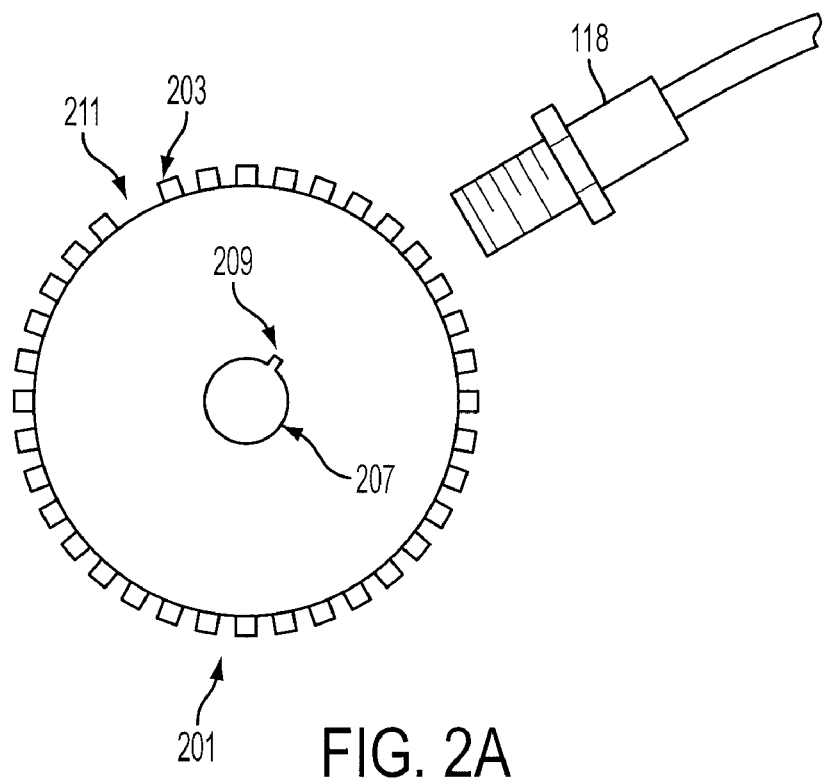
FIG. 2a is a schematic diagram of an example crankshaft position detecting means.

Referring now to FIG. 2a, a schematic of an example engine position indicating device is shown. Crankshaft timing wheel 201 may be coupled to crankshaft 40 for determining engine position. The wheel may be coupled to the engine crankshaft via a mounting hole 207. Further, the wheel can be oriented with respect to an engine position by aligning key way 209 to a mutual crankshaft key way. Alternatively, another type of locating device or scheme may be used to align the marker wheel to the crankshaft, a spline and locating dimples, for example. The marker wheel is shown having teeth (an example of engine angle markers) spaced at 10 degree intervals. At one wheel location, a tooth is omitted to provide additional engine position information. That is, the absence of a tooth can correspond to a unique crankshaft position, 40° after cylinder number one TDC compression or exhaust stroke for example. Alternatively, engine angle markers may be spaced at other intervals to increase or decrease engine position detection resolution as desired. Individual wheel teeth 203 may be made of a ferrous metal alloy, for example, so that they may cause engine position sensor 118 to output an electric signal when a tooth passes by the sensor as the engine rotates. The output of sensor 118 may be a function of a number of variables including: the distance between the face of sensor 118 and wheel teeth 203 (i.e., the gap), wheel material, sensor type, temperature, wheel speed, and tooth size.

Figure 2B:
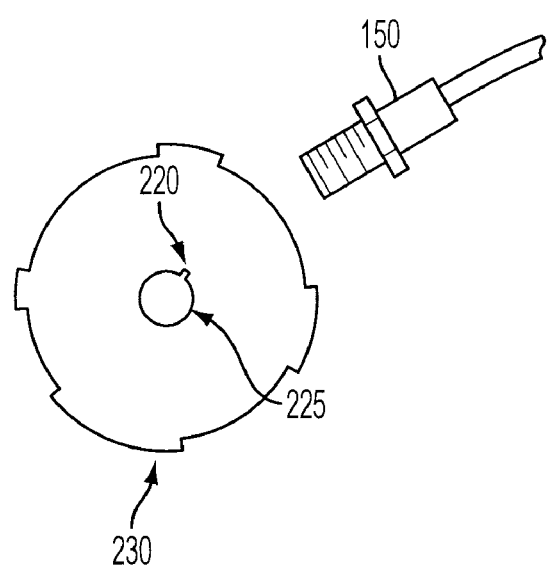
FIG. 2b is a schematic diagram of an example camshaft position detecting means.

Referring now to FIG. 2b, a schematic drawing of an example cam position sensing system is shown. The cam wheel 230 provides engine phase information so that the absolute position of the engine can be determined by logically interpreting camshaft and crankshaft position information. The illustrated wheel has four unequal length teeth that provide information with respect to the location and phase (i.e., stroke) of each cylinder of a four cylinder engine. By counting the crankshaft teeth that occur during the high or low portion of each cam tooth the absolute position of the engine can be determined. For example, the camshaft tooth representing cylinder number one may be equivalent to the duration of three crankshaft teeth, or 30°. When the camshaft signal is high and three crankshaft teeth are counted then the engine controller can determine that cylinder number one intake stroke has just occurred and that cylinder number three intake event will occur shortly thereafter, given the engine firing order. Camshaft wheel teeth are sensed by variable reluctance sensor 150. Since the camshaft rotates at half the speed of the crankshaft, the camshaft signal can take longer to recognize because at lower speeds the variable reluctance sensor generates less voltage for controller 12 to recognize. Therefore, the time it takes for controller 12 to synchronize to engine position may be closely related to the time it takes for the engine speed to reach a point where sufficient voltage is generated by sensor 150.

In an alternate embodiment, either or both of the tooth wheels may be replaced by another type of engine angle marker such as a wheel having light permeable slots for determining engine position by optical sensors, for example.

Note: The engine position sensing systems illustrated in FIGS. 2a and 2b are not intended to limit the scope or breadth of the description and as such are meant purely for purposes of illustration by example.

Figure 3:
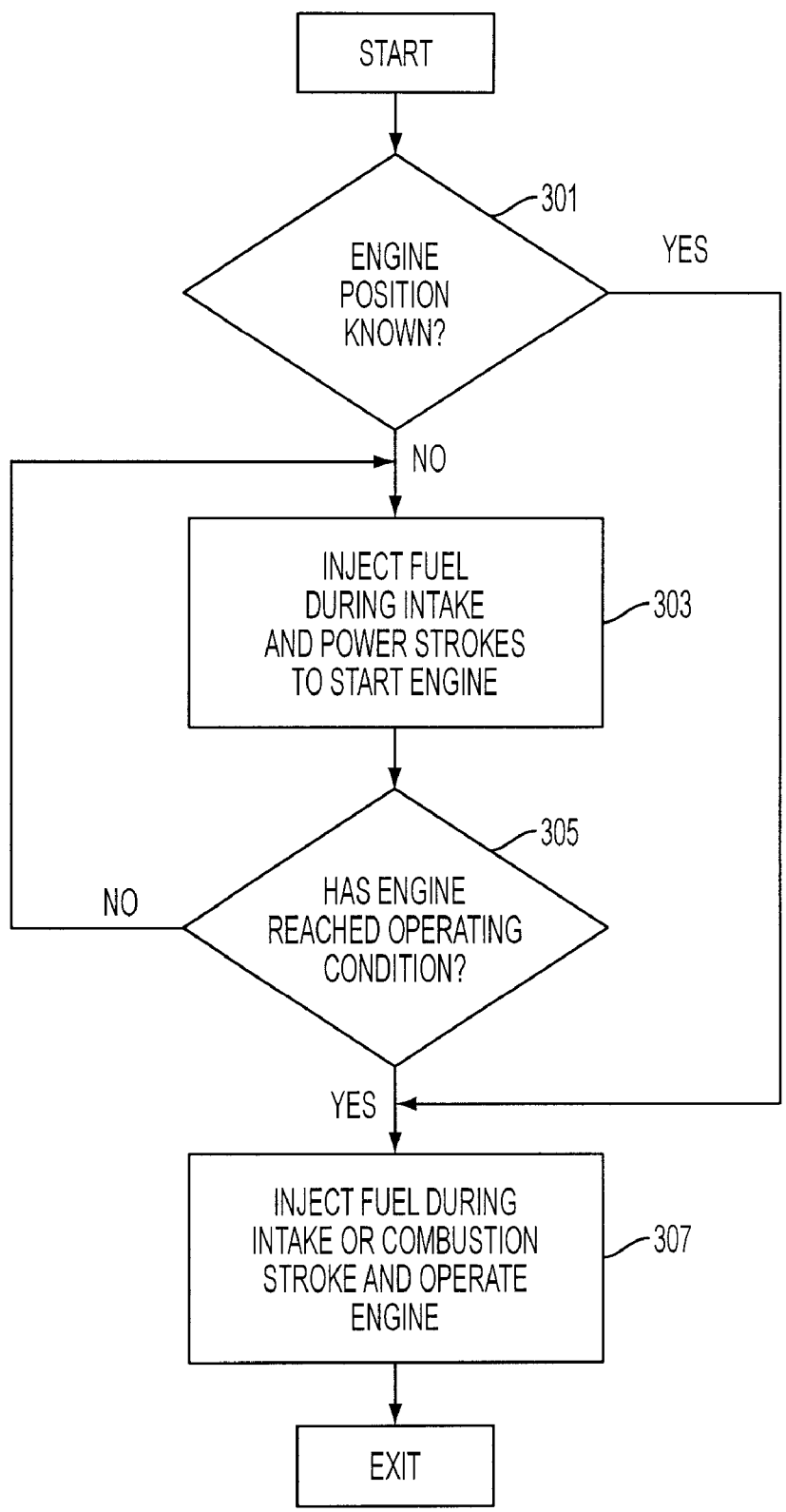
FIG. 3 is a flow chart of an example engine starting strategy.

Referring now to FIG. 3, a flow chart of an example strategy to start an engine is shown. The strategy may be applied to engines having a starter or to engines that are directly started by injecting fuel into a cylinder that has a trapped air amount. Further, the method may be applied to systems that remember engine position from a previous engine stop, store the engine position information in memory, and then use the information as a basis for starting the engine.

In step 301, the routine determines if the absolute engine position has been determined. The absolute engine position is determined by knowing the position of the piston in a cylinder and the stroke of the cylinder. For example, if the phase marker for cylinder number one of wheel 230 has passed sensor 150 and the crankshaft wheel 201 missing tooth is passing sensor 118 (indicating 40° after TDC (ATDC)) then controller 12 can determine that the engine is 40° ATDC compression of cylinder number one. On the other hand, if the cam signal is degraded and the crankshaft signal is not degraded then the position of cylinder one can be determined, but the engine phase remains uncertain because of the lack of phase information. If the absolute engine position is indeterminate the routine proceeds to step 303, otherwise the routine proceeds to step 307.

Sequential fuel injection is the injection of fuel to a cylinder that is based on the cylinder rather than a group of cylinders. In other words, fuel amount and timing may be adjusted individually for each cylinder. Sequentially injected fuel is injected to a cylinder depending on the position of the cylinder piston, the amount of fuel to be injected, and/or the valve timing of the cylinder. By injecting fuel sequentially, the engine air-fuel and torque response may be improved when compared to systems that inject fuel to all engine cylinders at the same instant. However, to sequentially inject fuel so that the injected fuel is not transferred to a later combustion event or so that the fuel is not expelled from the cylinder without meaningfully contributing to engine torque production, the phase of the engine cylinders should be known. Step 301 directs the engine control strategy to the appropriate injection strategy based on the available engine position information.

In step 303, fuel is injected into at least one cylinder of the engine in a manner that can shorten starting time when the absolute engine position is not known or when the absolute engine position has not been determined.

A direct injection engine may be quickly started by injecting fuel to a cylinder during the intake and power strokes of the cylinder. Fuel is injected during both strokes when cylinder stroke has not or cannot be readily determined so that the cylinder may combust an air-fuel mixture during a cycle of the cylinder. The cylinder cycle being defined as the amount of engine rotation that occurs before the cylinder sequence is repeated. For example, a cylinder cycle for a four stroke engine is 720 crankshaft angle degrees. The injection can be accomplished by merely knowing the crankshaft position since the only requirement to inject fuel is to know the piston position and direction of engine rotation. For example, when engine position has not been stored in memory at engine stop or when the camshaft position signal is degraded it may be more difficult to determine the stroke of a cylinder. However, crankshaft position may be determined by the location of a missing tooth of a crankshaft wheel, for example. And, fuel may be injected based on this limited engine position information by timing fuel injection relative to the missing tooth location.

Returning to step 303, fuel is injected during the intake and during the power stroke of at least one cylinder of a pair of cylinders that have pistons that are at substantially the same cylinder positions at the same time. For example, for a four cylinder engine having a firing order of 1-3-4-2, pistons for cylinders one and four are in the same cylinder location at the same time during engine rotation. The pistons for cylinders two and three also occupy the same cylinder position at the same time in their respective cylinders as well, albeit 180° degrees out of phase with cylinders one and four. By injecting into each cylinder at least once (i.e., multiple injections are also possible) before the cylinder piston reaches TDC ensures that fuel will be available for combustion during the compression stroke and power strokes even though the stroke of the cylinder may not be known. The fuel may be injected during the intake and power strokes or during the compression and exhaust strokes, but injection during the exhaust stroke may leave fuel in the cylinder for a subsequent combustion event. As a result, the cylinder air-fuel ratio during the subsequent combustion event may be richer than desired.

The fuel amount injected before the first occurrence of a piston reaching TDC during a cycle of the cylinder may be equal to or different than the amount of fuel injected before the second occurrence of the piston reaching TDC during the same cycle of the cylinder. In other words, for a cylinder receiving a fuel amount before each TDC occurrence during a cylinder cycle, the amount of fuel injected before TDC may be varied or may be kept substantially constant. In one example, the difference in the amount of fuel injected between the first and second occurrences of TDC may be made in response to the change in cylinder air amount that can occur as the engine speed increases.

For spark ignition engines, spark is initiated twice per cylinder cycle in step 303 so that the fuel that enters the compression stroke can be combusted in the cylinder. A spark event is initiated between each injection event so that two spark events occur during each cylinder cycle. Thus, even without knowing the stroke of a cylinder it is possible to initiate combustion in a cylinder by simply knowing the position of the piston in the cylinder irrespective of the phase of the cylinder being unknown. Spark and fuel injection timing are typically set to occur before TDC of the compression and exhaust strokes during a cylinder cycle, but it is also possible to delay spark until 20°-30° after TDC of compression and exhaust strokes.

The engine is started using the before-mentioned fuel and spark delivery strategies. The routine proceeds to step 305.

Note that it is possible to operate all engine cylinders or only a subset of the engine cylinders in this manner during an engine start. For example, four cylinders of an eight cylinder engine may be operated in this way while the remaining cylinders may receive a single injection for one TDC occurrence during a cylinder cycle, or alternatively, the cylinders may not be fueled until the engine reaches a predetermined operating condition such as an engine speed, a manifold pressure, or an amount of air flow through the engine. See the description of FIG. 7 for one example of a four cylinder engine operated in this manner.

In step 305, the routine determines if the engine has reached a predetermined operating condition. If the operating condition has not been reached the routine returns to step 303, otherwise the routine proceeds to step 307. The operating condition may be an engine speed, a manifold pressure, a predetermined number of combustion events, an amount of air flowing through the engine, and/or combinations of the before-mentioned conditions. In one example, when engine speed reaches 1000 RPM the routine proceeds to step 307.

In step 307, injection timing is set to a strategy that injects fuel before each occurrence of a piston reaching TDC during a cycle of a cylinder. Typically, the fuel amount for a cylinder cycle is injected prior to TDC of the compression stroke so that combustion can be initiated at a point that improves combustion efficiency and torque production. On the other hand, it is also possible to delay the initiation of combustion until after TDC of the combustion stroke (e.g., up to 40° ATDC) so that some of the combustion energy can be used to improve catalyst heating, for example. Irrespective of the specific injection timing, the entire fuel charge is injected so that it is intended to be combusted during a single cylinder cycle. This injection strategy can be used from the onset of engine starting if the absolute position of the engine has been established in step 301. However, when the absolute engine position cannot or is not established during a start, the above-mentioned strategy using at least an injection before each TDC occurrence during a cylinder cycle can be applied.

Note that when injecting fuel before the piston reaches TDC of the compression stroke, for example, the fuel may be injected in a single interval or it may be injected by a plurality of injections that occur before combustion is initiated in the cylinder, during a cycle of the cylinder. Further, the fuel may be injected during the intake stroke, compression stroke, or over an interval that includes both the intake and compression strokes.

If fuel is injected before each TDC of a cylinder cycle, a portion of the injected fuel may not be combusted in the cylinder and therefore may not produce useful engine work since one of the injections will occur prior to TDC of the exhaust stroke. As a result, it can be desirable to transition from injecting fuel at each occurrence of a piston reaching TDC to a strategy that injects fuel before a single occurrence of a piston reaching TDC during a cylinder cycle. By doing so, a larger percentage of fuel may be combusted before being exhausted from the cylinder, thereby, improving fuel efficiency.

When the preceding steps determine to start the engine by injecting fuel to a cylinder each time the cylinder piston reaches TDC, the fuel injection is transitioned to injecting a one fuel amount for one occurrence of the piston reaching TDC during a cylinder cycle after the predetermined operating condition is reached in step 305. The transition is initiated by deactivating the injected fuel amount that occurs before the piston reaches TDC for one of the two occurrences that the piston reaches TDC during a cylinder cycle. Injection of one fuel amount may be deactivated to one cylinder from the cylinder pair being simultaneously fueled. Further, where more than one pair of cylinders are receiving fuel before each time a piston in the respective cylinder reaches TDC, other cylinder pairs may be transitioned in the same manner. Thus, during the transition, one cylinder of a cylinder pair will receive a single fuel amount for each time the cylinder piston reaches TDC while the other cylinder will receive one fuel amount for every other time the cylinder piston reaches TDC. Since engine phase is not known at this time, deactivation of one injected fuel amount may not change operation of the engine or it may result in a cylinder misfire. For example, it is possible for the strategy to deactivate delivery of a fuel amount that could have resulted in engine torque generation or that would have been expelled to the exhaust system. Depending on the cylinder stroke where injection is stopped to the cylinder, the engine may misfire or continue operating with less noticeable effect. The cylinder misfire may be determined by observing engine speed, engine acceleration, cylinder pressure, or by ionization sensing.

If stopping injection for one of the occurrences of TDC results in a misfire, the strategy determines that the fuel deactivated cylinder is on the intake stroke while the other cylinder of the cylinder pair was on the power stroke. Having determined the stroke for each cylinder of the cylinder pair, the phase and position of remaining cylinder can be determined from the engine firing order so that all engine cylinders can be transitioned to receive a single fuel amount intended for combustion each cylinder cycle. Accordingly, the engine can be started as nearly quick as if the engine position and phase had been known and then transitioned over to a more efficient injection mode.

Thus, the strategy is able to use the more efficient injection strategy where the fuel amount is injected before an occurrence of a TDC compression stroke when the absolute (i.e., where the stroke of the cylinder and the crankshaft angle are determined) engine position can be determined. And, when the absolute engine position is not or cannot be immediately determined (e.g., when an engine position sensor signal has degraded), the strategy can use an alternate injection strategy that includes injecting fuel for each occurrence of a piston top-dead-cylinder position so that engine starting is possible and quick without knowing the absolute engine position.

Figure 4:
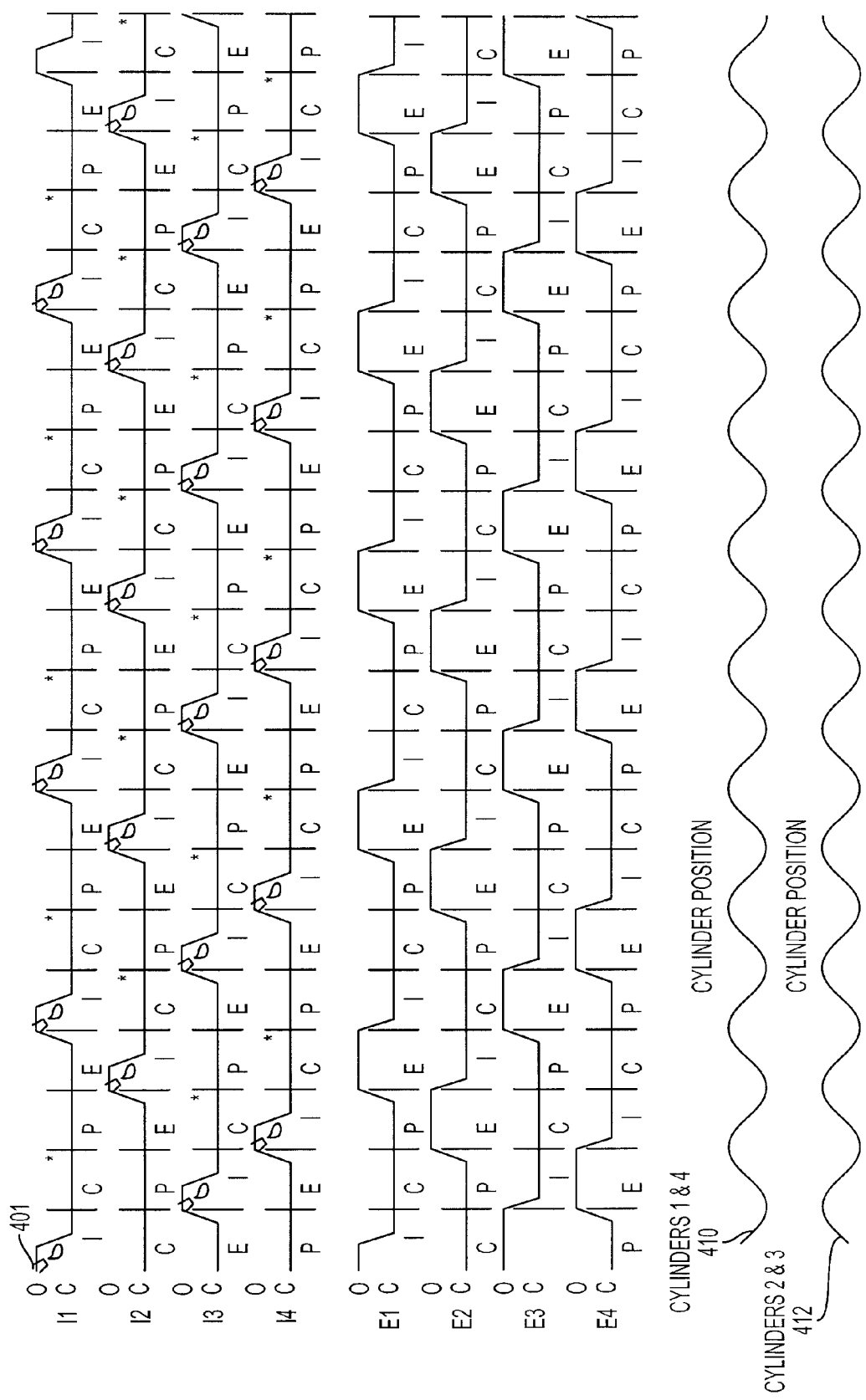
FIG. 4 is a timing chart of an example sequential fuel injection starting sequence.

Referring now to FIG. 4, a known single fuel injection sequence during an engine start is shown. The figure illustrates example intake and exhaust valve timing for a four cylinder engine having a firing order of 1-3-4-2. The sequence begins on the left side of the figure and terminates on the right side. The position of pistons in the engine cylinders is illustrated by traces 410 and 412. Intake valve timing is represented by the traces labeled I1-I4. Exhaust valve timing is represented by the traces labeled E1-E4. The open valve positions are indicated by the "O" labels and closed valve positions are indicated by the "C" labels located at the left hand side of the respective valve traces. Each valve trace is accompanied by vertical lines that indicate the relative engine position and the respective cylinder stroke is indicated by the letter that occupies the space between the vertical markers. Intake strokes are represented by "I", exhaust strokes by "E", compression strokes by "C", and power strokes by "P". The piston positions during the sequence are illustrated by the bottom two traces in the figure. Injection timing for each cylinder cycle is indicated by the injector and fuel drops similar to those of marker 401. Cylinder spark events are indicated by symbols.

Note that since the X axis of the figure is illustrated with respect to engine position it may be less apparent that engine speed is increasing with the onset of combustion. However, the figure does provide the relative timing of cylinder related events.

The engine starting position may be determined at engine start from an indication based on one or more sensors or from data stored in controller 12 memory that was obtained during a previous engine stop. Alternatively, engine position may be determined by sensors that begin to output engine position information as the engine turns, from variable reluctance sensors for example. After engine position is established, fuel is injected with respect to the known engine position. That is, fuel delivery is timed so that injection occurs during a desired stroke and at a desired engine crankshaft angle or piston position of the respective cylinder. This example illustrates injection timing for a sequential injection strategy. One fuel amount is injected before each spark event and before TDC of the compression stroke so that the fuel may be combusted in a single cylinder cycle. The amount of fuel injected may be spread out over a number of injection intervals; however, the injected fuel amount is intended to be combusted beginning at a single engine position of the cylinder cycle.

Figure 5:
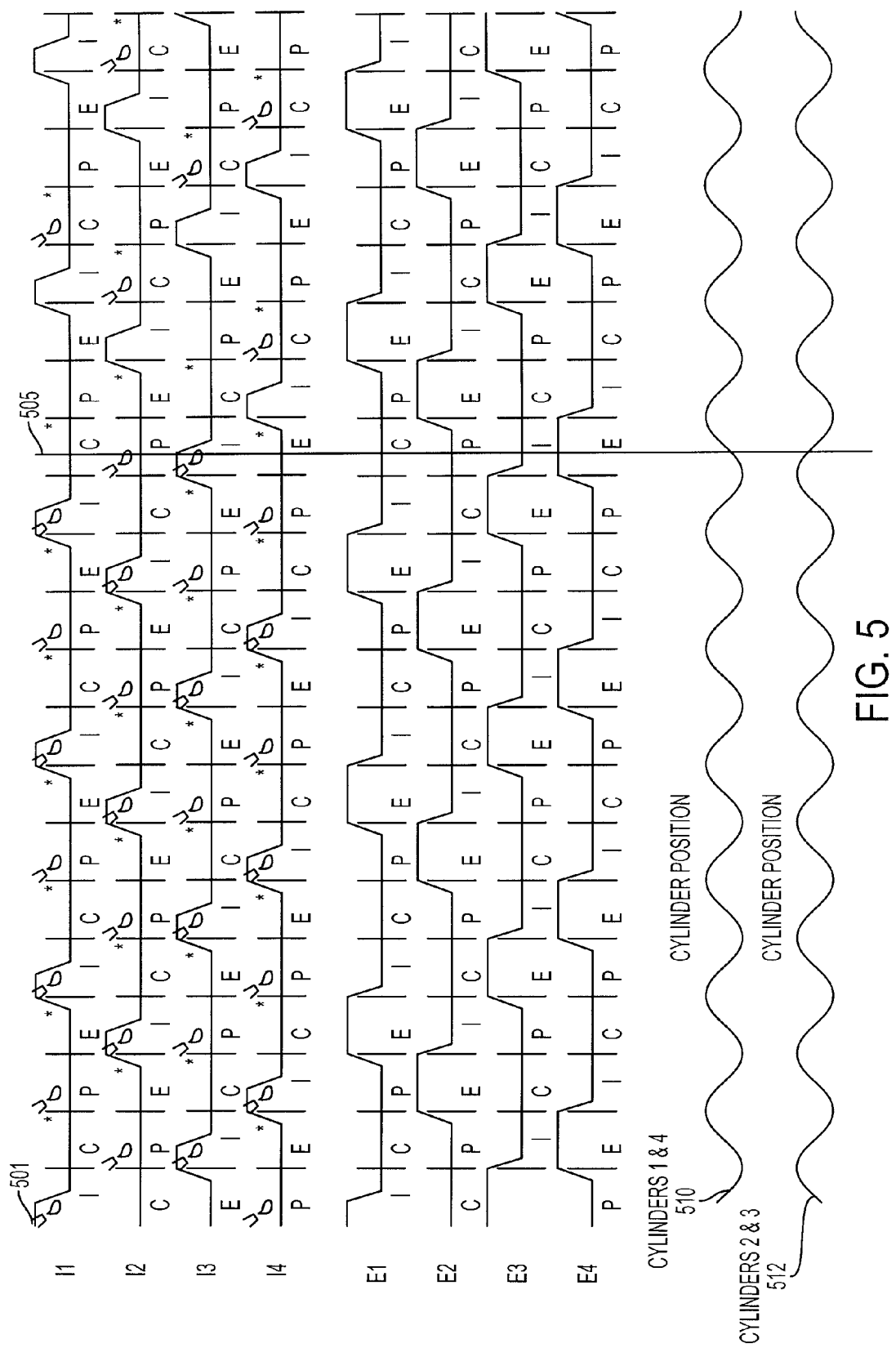
FIG. 5 is a timing chart of an example starting sequence for starting an engine without engine phase information.

Referring now to FIG. 5, a fuel injection sequence during an engine start is shown. FIG. 5 is similar to FIG. 4 in terms of signals and signal labeling. The position of pistons in the engine cylinders is illustrated by traces 510 and 512. In this embodiment, the engine position sensing means or controller memory 108 provides information by which crankshaft position may be determined. However, from the initial information it is not possible to determine the phase of the engine. That is, the specific stroke (e.g., compression stroke) of each cylinder may not be initially determined from signals or data at the beginning of the engine start.

Fuel is initially injected into cylinder one and cylinder four. The fuel injections may be simultaneous or they may be slightly offset (e.g., up to ±90°). Further, the injections may be used to directly start the engine or they may be made as the engine is cranked over by an auxiliary motor, a starter motor for example. The fuel is injected into cylinder one and into cylinder four because the two cylinders are a pair of cylinders that occupy the same position in the respective cylinders at the same time. The difference between the two cylinders is that one cylinder is on the intake stroke while the other cylinder is on the power stroke. Since the stroke of the cylinders cannot be determined from the available information, each cylinder receives a fuel injection so that one of the cylinders may combust the air-fuel mixture during the compression stroke. The fuel can be combusted in the compression stroke by the spark event that is initiated subsequent to the fuel injection. In this example, a spark is initiated just prior to each cylinder of the cylinder pair reaching TDC of the piston stroke. In other words, both spark and fuel injection occur before the piston reaches a first TDC condition during a cycle of the cylinders. Spark is produced in both cylinders so that torque may be generated by at least one of the two cylinders. Namely, the cylinder that is on the compression stroke can generate torque since exhaust and intake valves will be closed at the time of combustion in the cylinder. On the other hand, compression ignition engines can time the onset of combustion via injection timing. In this example, at least a portion of the fuel is injected before the cylinder reaches TDC and the high compression position of the piston so that ignition occurs during the compression stroke.

After cylinders one and four pass the first piston TDC location another fuel injection occurs during the same cylinder cycle. This injection is used to fuel the cylinder of the cylinder pair that previously produced less engine torque because it was on an exhaust stroke during the prior ignition event. Cylinders that are on the exhaust stroke during the ignition event expel much of the air-fuel mixture to the exhaust system without having generated engine torque. This injection cycle and the generation of ignition spark continue until the engine reaches a predetermined condition. Vertical line 505 represents the time during start that the engine reaches a speed of 1000 RPM, for example. In addition, the figure shows the injection location changing as the engine reaches the predetermined operating condition and synchronization is established. In this example, the injection is delayed into the combustion stroke after the engine reaches a predetermined operating condition. Alternatively, injection may initially be placed during the compression and exhaust strokes and then transitioned over to injection during the intake stroke. Also, note that the injections may overlap intake and compression and/or power and exhaust strokes. However, if fuel is injected during the compression and exhaust strokes then less of the fuel injected during the exhaust stroke may be expelled to the exhaust system causing the subsequent air-fuel mixture to be enriched.

Spark is delivered twice per cylinder cycle from the beginning of the start. This makes combustion and torque generation possible for one of the two fuel injections that are scheduled during the cylinder cycle. Specifically, the ignition event that occurs during the compression cycle can initiate combustion and torque generation while less torque is generated by the second spark that occurs during the exhaust stroke. After the engine reaches a predetermined condition the second spark event may be deactivated.

Figure 6:
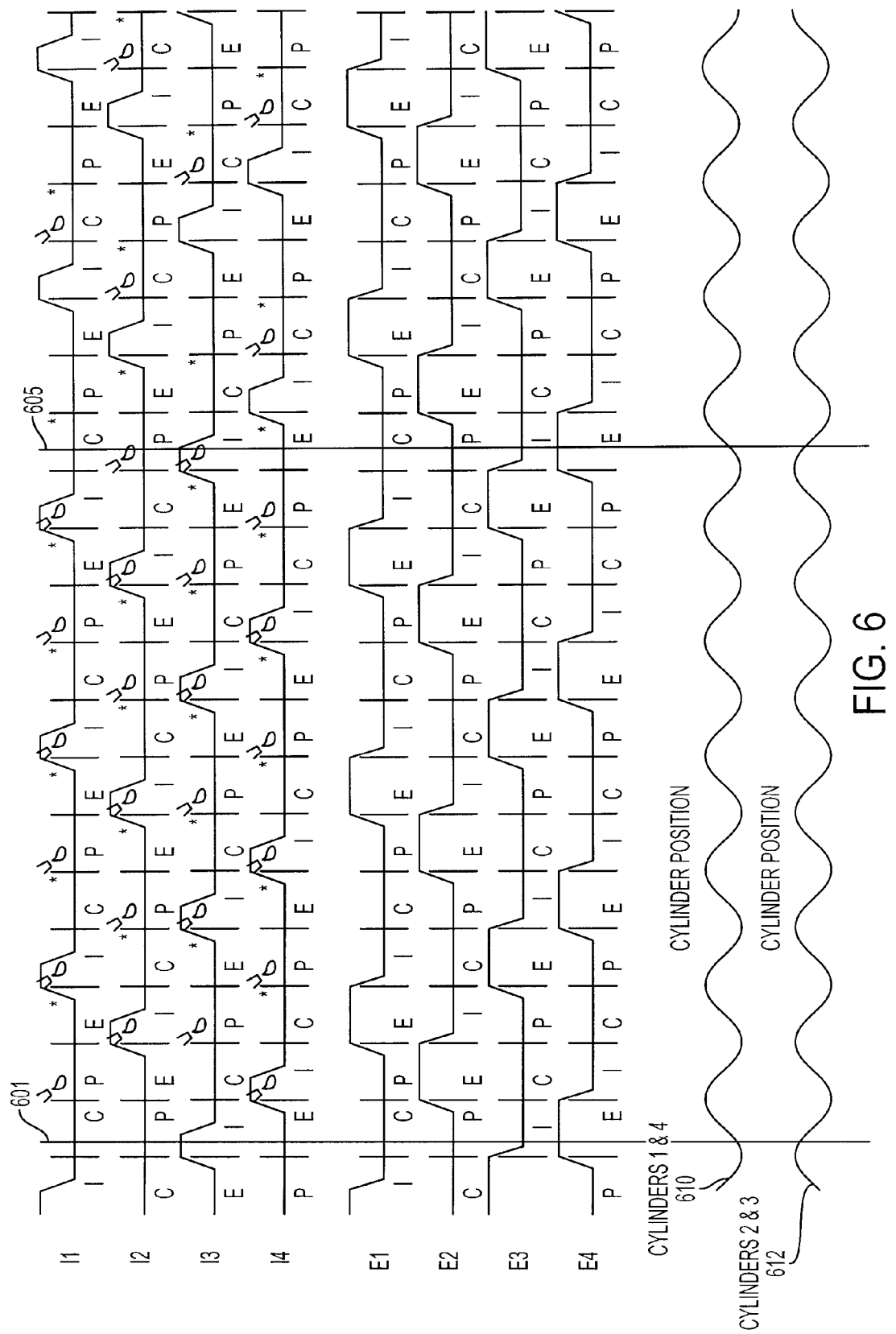
FIG. 6 is a timing chart of an alternative example starting sequence for starting an engine where engine phase information is not initially known.

Referring now to FIG. 6, an alternative starting strategy is illustrated. This figure illustrates signals from a strategy that determines engine position after the engine begins to move, but where the phase or stroke of the cylinder is not determined because of a degraded sensor signal, for example. The labeling of FIG. 6 is similar to that of FIGS. 4 and 5. The position of pistons in the engine cylinders is illustrated by traces 610 and 612.

The engine initially rotates without engine controller 12 injecting fuel or initiating a spark because engine position is not established. Shortly after TDC of compression stroke, cylinder one, engine position is recognized by identifying missing tooth location 211 and is indicated by the vertical marker 601. Injection and spark commences during the next cylinder stroke for cylinders one and four. Fuel is injected to both cylinders so that one cylinder is fueled during the intake stroke while the other is fueled during the power stroke. Combustion is initiated by the spark generated in a subsequent compression stroke or spark is initiated in the exhaust stroke so as to produce less engine torque. The engine timing follows the same sequence illustrated in FIG. 5 for the remainder of the starting sequence. Namely, the engine cylinders are transitioned from injecting simultaneously in two cylinders to injecting sequentially in each cylinder.

Figure 7:
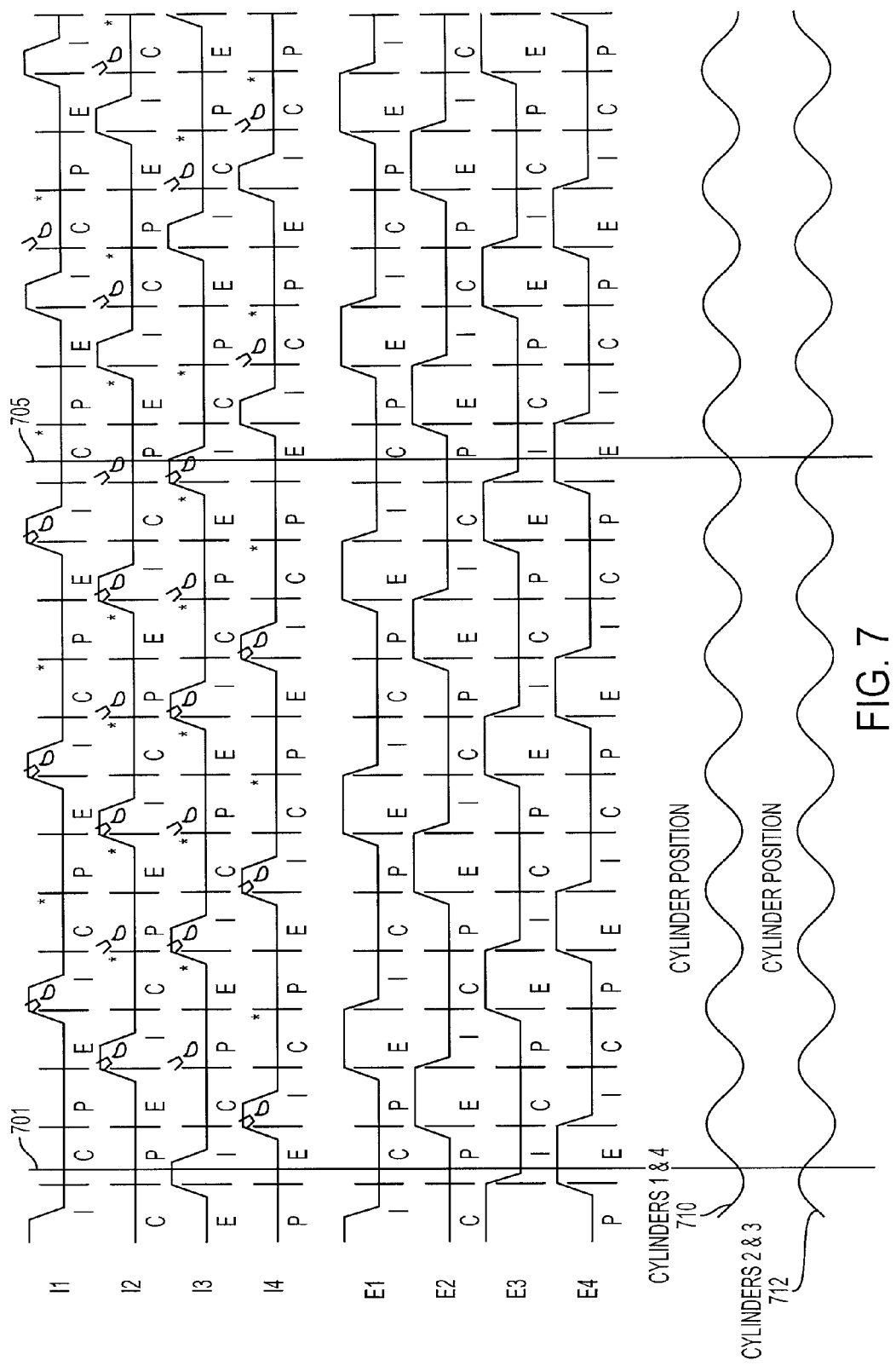
FIG. 7 is a timing chart of another alternative example starting sequence for starting an engine where engine phase information is not initially known.

Referring now to FIG. 7, another alternative starting strategy is illustrated. This figure also illustrates signals from a strategy that determines engine position after the engine begins to move, but where the phase or stroke of the cylinder is not determined. The labeling of FIG. 7 is similar to that of FIGS. 4-6. The position of pistons in the engine cylinders is illustrated by traces 710 and 712.

The engine initially rotates without engine controller 12 injecting fuel or initiating a spark because engine position is not established. Shortly after TDC of compression stroke, cylinder one, engine position is recognized by identifying missing tooth location 211 and is indicated by the vertical marker 701. Injection and spark commences during the next intake stroke of cylinder four. The injection of fuel to cylinder four is made without regard to the phase of cylinder four because engine phase has not been determined. Therefore, it is possible that fuel is injected to cylinder four during the power stroke because the injection is based on sensing the crankshaft sensor missing tooth. Alternatively, injection may be initiated in cylinder one rather than cylinder four because the pistons of cylinders one and four are in the same cylinder position at the same time. The fuel is injected to cylinders one and four once for every two piston TDC events. Thus, fuel injection for cylinders one and four is similar to sequential fueling, but since the engine phase in not known it is possible that some injections of fuel will occur during the power stroke instead of the intake stroke. It is also possible to stop fuel injection to cylinders one and four while only fueling cylinders two and three during a start. By not injecting to cylinder one and four it may be possible to reduce the amount of fuel expelled to the exhaust system during a start when compared to injecting fuel without knowledge of cylinder phase.

Fuel is injected substantially simultaneously into cylinders two and three before each occurrence of the pistons being at TDC. As described above, injecting before each occurrence of piston TDC ensures that fuel is available for combustion initiated during the compression stroke of the cylinder even though the phase of the cylinder is not known. This injection sequence continues until the engine speed reaches a desired value, indicated by vertical marker 705. After reaching this condition, one of the two injections occurring during the cylinder cycle is deactivated for one cylinder of cylinder pair two and three. If a misfire occurs then it is determined that the stroke of the deactivated cylinder at the time of injection was the intake stroke rather than the power stroke. This information is used to establish the phase of the cylinders, and engine controller 12 synchronizes the fuel timing for all of the cylinders given this information.

Note that the signal timings for FIGS. 4-7 may be varied from those illustrated in the figures without departing from the scope or intent of the present description and are therefore meant only for illustration purposes. For example, the numbering and selection of cylinder pairs used during simultaneous paired injection can be different than those illustrated and may be based on the number of engine cylinders and the combustion sequence of the engine or other considerations. Further, multiple spark or fuel events may occur at or near the locations illustrated to improve combustion without departing from the scope or intent of the description.

As will be appreciated by one of ordinary skill in the art, the routine described in FIG. 3 may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages described herein, but it is provided for ease of illustration and description. Although not explicitly illustrated, one of ordinary skill in the art will recognize that one or more of the illustrated steps or functions may be repeatedly performed depending on the particular strategy being used.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. A method for starting an engine having fuel directly injected into an engine cylinder, the method comprising:
    directly injecting a first fuel amount into each cylinder of a cylinder pair at substantially the same time, said cylinder pair having pistons in substantially the same positions at the same time, said first fuel amount injected before said pistons of said cylinders reach a first TDC position; and after said first TDC position, directly injecting a second fuel amount into said cylinders at substantially the same time before said pistons reach a second TDC position during a cycle of an internal combustion engine, said cycle during an engine start.

2. The method of claim 1 further comprising transitioning from injecting fuel to both cylinders of said cylinder pair before said pistons reach a first TDC of said cylinders and injecting fuel to both cylinders of said cylinder pair before said pistons reach a second TIDC during a cylinder cycle, to injecting a first fuel amount into a first cylinder of said cylinder pair before said pistons reach a first TDC position and injecting a second fuel amount into a second cylinder of said cylinder pair before said pistons reach a second TDC of a cylinder cycle.

3. The method of claim 2 wherein said transitioning is in response to the speed of said engine.

4. The method of claim 2 wherein said transitioning is in response to an intake manifold pressure.

5. The method of claim 2 wherein said transitioning is in response to an amount of air flowing through said engine.

6. The method of claim 2 wherein said transitioning is in response to a number of cylinder combustion events.

7. The method of claim 1 wherein said internal combustion engine is a spark ignition engine.

8. The method of claim 7 further comprising initiating a first spark event after injecting said first fuel amount and initiating a second spark event after injecting said second fuel amount.

9. The method of claim 1 wherein said internal combustion engine is a compression ignition engine.

10. The method of claim 1 wherein said first fuel amount is injected during at least the compression stroke of said cylinder and wherein said second fuel amount is injected during at least the exhaust stroke of said cylinder.

11. The method of claim 1 wherein said first fuel amount is injected at least during the intake stroke of said cylinder and wherein said second fuel amount is injected at least during the power stroke of said cylinder.

12. The method of claim 1 wherein said first fuel amount and said second fuel amount are substantially the same fuel amount.

13. The method of claim 1 wherein said first fuel amount and said second fuel amount are different.

14. A method for starting an engine having fuel directly injected into an engine cylinder, the method comprising:
    starting an engine a first time by a first sequence wherein fuel is injected into each cylinder of a cylinder pair at different times during a cycle of said cylinder pair, said fuel injected into each cylinder of said cylinder pair before a spark event in each cylinder of said cylinder pair; and
    starting said engine a second time by a second sequence wherein fuel is injected into each cylinder of said cylinder pair at substantially the same time before the pistons of said cylinder pair reach each TDC during a cycle of said cylinder pair and before a spark event in each cylinder of said cylinder pair.

15. The method of claim 14 wherein said second sequence is selected in response to degradation of an engine position signal.

16. The method of claim 14 wherein said first sequence the amount of said fuel injected is split into more than one injection interval.

17. The method of claim 14 wherein said second sequence substantially equal amounts of fuel are injected during the compression and exhaust strokes.

18. The method of claim 14 wherein fuel is injected during said second sequence before said spark event and during the compression stroke of one cylinder of said cylinder pair.

19. The method of claim 14 wherein fuel is injected during said second sequence before said spark event and during the exhaust stroke of one cylinder of said cylinder pair.

20. The method of claim 14 wherein fuel is injected during said second sequence before said spark event and during the power stroke of one cylinder of said cylinder pair.

21. The method of claim 14 wherein fuel is injected during said second sequence before said spark event and during the intake stroke of one cylinder of said cylinder pair.

22. A computer readable storage medium having stored data representing instructions executable by a computer to control an engine having fuel directly injected into an engine cylinder, said storage medium comprising:
    instructions for injecting a fuel amount to each cylinder of a cylinder pair at substantially the same time, said cylinder pair having pistons in substantially the same positions at the same time, said fuel amount injected into each cylinder of said cylinder pair at substantially the same time, said fuel amount injected twice during a cycle of said cylinder pair.

* * * * *